US006065940A

United States Patent [19]

Fleischer et al.

[11] Patent Number: 6,065,940

[45] Date of Patent: May 23, 2000

[54] DIAPHRAGM DOSING PUMP

[75] Inventors: Horst Fleischer; Klaus Müller, both of Karlsruhe, Germany

[73] Assignee: Wolfgang Eichler GmbH & Co. KG, Pfinztal, Germany

[21] Appl. No.: 09/192,542

[22] Filed: Nov. 17, 1998

[51] Int. Cl.$^{7}$ .............................. F04B 49/00; F04B 39/10

[52] U.S. Cl. .............................................. 417/63; 417/535

[58] Field of Search ................................ 417/521, 534–5, 417/63, 245

[56] References Cited

U.S. PATENT DOCUMENTS

| | | | |
|---|---|---|---|
| 4,309,153 | 1/1982 | Panick et al. | 417/252 |
| 4,523,903 | 6/1985 | Arens | 417/489 |
| 4,619,589 | 10/1986 | Muller et al. | 417/388 |
| 5,707,217 | 1/1998 | Loeffler | 417/534 |
| 5,971,723 | 10/1999 | Bolt et al. | 417/63 |

FOREIGN PATENT DOCUMENTS

| | | |
|---|---|---|
| 2651614 | 5/1978 | Germany . |
| 4219664 | 12/1993 | Germany . |
| 55-054683 | 4/1980 | Japan . |

*Primary Examiner*—Thomas N. Moulis

*Attorney, Agent, or Firm*—Antonelli, Terry, Stout & Kraus, LLP

[57] ABSTRACT

A diaphragm dosing pump has a dosing chamber, which has an inlet and a pressure-side outlet, as well as a dosing diaphragm operated by a stroke drive, and a delivery chamber upstream of the dosing chamber has a suction connection for the medium to be dosed and a pressure connection, as well as a delivery diaphragm operated by the stroke drive. The delivery chamber, is connected by means of its pressure connection to a receiving container connected on the outlet side to the dosing chamber inlet.

33 Claims, 3 Drawing Sheets

16 2 26 26 6 9 18 8 22 3 7a 8a 7 17 27 4 19 11 5 26

1
13
15
21
12
25
21
10
20
9
6
24
14
8a
3
7a
2
4
11
22
5
28

2
9
18
8
22
3
8a
17
27
19
5
26
26
16
26
6
7a
7
4
11

1
2
6
13
14
21
21
28
29
30
31
31
32
33

DIAPHRAGM DOSING PUMP

BACKGROUND OF THE INVENTION

1. Field of the Invention

The invention relates to a diaphragm dosing, metering or proportioning pump having a dosing chamber, which is provided with an inlet and a pressure-side outlet, as well as a dosing diaphragm operated by a stroke drive, and having a delivery chamber upstream of the dosing chamber and which is provided with a suction connection for the medium to be dosed and a pressure connection, as well as a delivery diaphragm operated by a stroke drive.

2. Description of the Prior Art

Such dosing pumps are more particularly used where it is necessary to reproducibly deliver and supply in dosed manner a liquid medium in small or medium quantities, e.g. in the chemical or pharmaceutical industry, in water treatment and purification plants of different types.

Such diaphragm dosing pumps are in many cases required to have a high dosing precision, even in the case of very small dosed quantities, but this is difficult to achieve. This more particularly applies with liquids, which have a high vapor pressure and/or contain dissolved gases. As a result of the suction pressure, during delivery vapor formation or degassing occurs. As a result of the gases entering the dosing chamber the degree of filling is reduced, so that the dosing precision is significantly lessened.

Another problem occurs in the control of the dosing, because in particular with small or very small dosing quantities conventional flowmeters, e.g. rotating meters and the like, operate too imprecisely as a result of the nonsteady flow caused by the diaphragm stroke and the measurement signals supplied by them are unsuitable for the readjustment of the pump.

U.S. Pat. No. 2,826,067 discloses a control device for a pump delivering from a storage tank. An additional measuring cylinder is connected to the tank, which has measuring devices for determining the volume delivered per time unit. By alignment with a nominal value it is possible to control the pump rate in operation. Due to the hydraulic connection between the tank and the measuring cylinder e.g. constructed as a level gauge and for avoiding an excessive suction pressure, the storage tank must be positioned above the pump, which greatly restricts the range of uses of this construction.

A similar arrangement is disclosed in U.S. Pat. No. 4,897,797. The delivery rate is controlled so that a number of pump strokes determined in a calibration test, during which the liquid level in the measuring cylinder is lowered by a level fixed by two sensors, is compared with the number of strokes actually necessary for this reduction. Also in the case of U.S. Pat. No. 4,897,797, the aforementioned constructional and delivery disadvantages arise as a result of the pump filling fan dependent on the suction head.

German Patent 42 19 664 A1, discloses a diaphragm dosing pump, having an associated auxiliary pump constructed as a diaphragm pump end with which the actual working or dosing chamber of the diaphragm dosing pump is filled independently of the suction head under pressure. The delivery diaphragm of this auxiliary pump is connected to the lifting rod operating the dosing diaphragm. A self-venting valve is provided for the discharge of the gas volumes formed during delivery in the dosing chamber of the diaphragm dosing pump.

In this constructionally complicated apparatus, there is admittedly a filling and venting of the dosing chamber independent of the suction head, but on the one hand the flow measurement for the precise control of dosing is problematical as a result of the nonsteady flow and on the other liquid losses arise due to the vent valve, which leads to relevant errors particularly with very small dosing quantities.

SUMMARY OF THE INVENTION

The invention uses a diaphragm dosing pump, in which the problem of imprecise dosing is solved in a constructionally simple way.

In the case of the diaphragm dosing pump of the aforementioned type, the invention solves the problem of imprecise dosing by having the delivery chamber connected by means of its pressure connection to a receiving container, which is connected on the outlet side to the inlet of the dosing chamber.

The invention is based on the concept of not directly sucking and dosing the dosing liquid from the storage tank containing the dosing liquid, but instead initially delivering the dosing liquid into a receiving container and then allowing the dosing liquid to flow from the receiving container into the dosing chamber. The receiving container is filled via the delivery chamber in which acts the delivery diaphragm forming a pump member.

Slow separating processes between the liquid and gaseous constituents of the dosing fluid can take place in a complete manner in the receiving container. As a result, a bubble-free liquid flows into the dosing chamber and can be precisely dosed.

If the receiving container has an adequate fill quantity, it is also possible to remove the dosing fluid storage tank from the diaphragm dosing pump, e.g. for replacing a full by an empty storage tank without having to interrupt the dosing process.

According to a preferred embodiment of the invention the storage tank is positioned above the dosing chamber. The dosing fluid can flow into the dosing chamber under gravity, which reliably avoids degassing processes in the dosing chamber, which are due to a suction pressure necessary through a given suction head.

According to another advantageous embodiment of the invention the receiving container has two partial areas based on the principle of communicating tubes, which are in each case hydraulically connected at both ends, connected by means of a common discharge line to the dosing chamber inlet and whereof one partial area is formed into a flow measuring tube. The common discharge line contains a shutoff valve, which in the closed position only frees the path from the partial area constructed as the measuring tube to the dosing chamber inlet. In the closed position of the shutoff valve a flow measurement can take place in the measuring tube. As degassing in the dosing chamber is substantially avoided through the provision of the receiving container, the flow quantity determined by means of the measuring tube precisely corresponds to the liquid quantity actually dosed by the diaphragm dosing pump via the dosing chamber outlet.

Advantageously, the shutoff valve is controlled in automated manner, so that during dosing operation the shutoff valve can carry out a flow measurement for checking the dosed liquid quantity at adjustable, regular time intervals.

In a further preferred embodiment the receiving container has an overflow open with respect to the atmosphere and by means of which also gas volumes arising during degassing processes, e.g. due to the suction head between the receiving container and the storage tank can be removed. By means of this overflow removal air delivered to the storage tank is also removed during the brief overflow removal from the dosing pump during operation.

According to the preferred development of the invention the dosing diaphragm and delivery diaphragm are located on a common piston rod driving them reciprocally which keeps construction costs low. This can in particular be achieved in that the dosing diaphragm at the rear part remote from the dosing chamber. In addition the delivery diaphragm acts as a pump member in the delivery chamber. In order to obtain a suction or pressure action despite the equidirectional, identical stroke movement of the dosing diaphragm and the delivery diaphragm in the delivery chamber, the volume displaced per diaphragm stroke in the delivery chamber by the dosing diaphragm is smaller than the volume displaced by the delivery diaphragm and the effective delivery volume results from the volume difference of the displaced volumes.

According to the preferred embodiment of the invention the delivery chamber is formed by an annular clearance arranged concentrically to the piston rod. Through the annular clearance-like construction there is an adequate bearing surface for the two diaphragms and they consequently have a long service life, even during permanent operation.

Advantageously the diameter of the annular clearance, on the side facing the delivery diaphragm and where advantageously issue the suction connection and pressure connection of the delivery chamber, is larger than on the side facing the dosing diaphragm. This arrangement of the one hand avoids a collection of gas volumes in the annular clearance and on the other enables in a simple way the aforementioned volume difference to be achieved and which determines the effective delivery volume of the delivery chamber.

According to the preferred development there is an additional, pressure-side connection to the annular clearance area adjacent to the dosing diaphragm, which prevents a collection of gas volumes in this annular clearance area which would lead to a significant deterioration of the delivery. In particular, the additional, pressure-side connection should issue into the pressure connection the delivery container secured with a check valve.

As had already been stated, during the movement of the piston rod the volume displaced by the dosing diaphragm is smaller than the volume displaced by the delivery diaphragm. The effective feed volume resulting from the volume difference in the delivery chamber should be greater than the dosing volume simultaneously displaced in the dosing chamber, which ensures that a larger liquid quantity is subsequently delivered into the receiving container than is removed therefrom by the dosing process. Thus, during the operation of the diaphragm dosing pump, the receiving container is constantly filled, so that a possible overfilling can be removed by means of a receiving container overflow.

Advantageously, on the measuring tube is provided at least one sensor for determining the fill level, making it possible to record over a period of time the pattern of the fill level and with which it is consequently possible to determine the volume delivered from the receiving container.

Preferably, a control device is connected to the sensor for the automatic control of the stroke drive. As a result, the diaphragm dosing pump drive is controlled on the basis of the values recorded by the sensor.

Advantageously, the control device has a unit for giving a nominal value fixing the delivery volume per unit of time, a unit for determining the actual value and a regulator or controller for aligning or matching the nominal and actual values, so as to be able to regulate the diaphragm dosing pump in operation to a nominal value, while taking account of the actual value.

The unit for determining the actual value is preferably connected to the at least one sensor, in order to be able to use the fill level recorded on the measuring tube with the at least one sensor as a basis for the volume actually delivered by the pump.

In a further advantageous construction the sensor is a pressure sensor which makes it possible to determine the fill level with a single sensor.

In an alternative construction on the measuring tube can be provided at different levels at least two sensors, which permits the sensing of the liquid level in the measuring tube e.g. by ultrasonics, light barriers, lasers or capacitive sensors.

Advantageously the stroke drive of the diaphragm dosing pump is a stepping motor, which permits a digitized, batchwise delivery, a so-called pulse-pause delivery.

In an alternative embodiment the stroke drive operates the delivery diaphragm by means of a synchronous or asynchrounous motor with frequency inversion with a constant stroke path or with a constant stroke frequency, the delivery volume per stroke being defined by the stroke path.

BRIEF DESCRIPTION OF THE DRAWINGS

The invention is described in greater detail hereinafter relative to an embodiment and the attached drawings, wherein show.

DETAILED DESCRIPTION OF THE INVENTION

Figure 1:
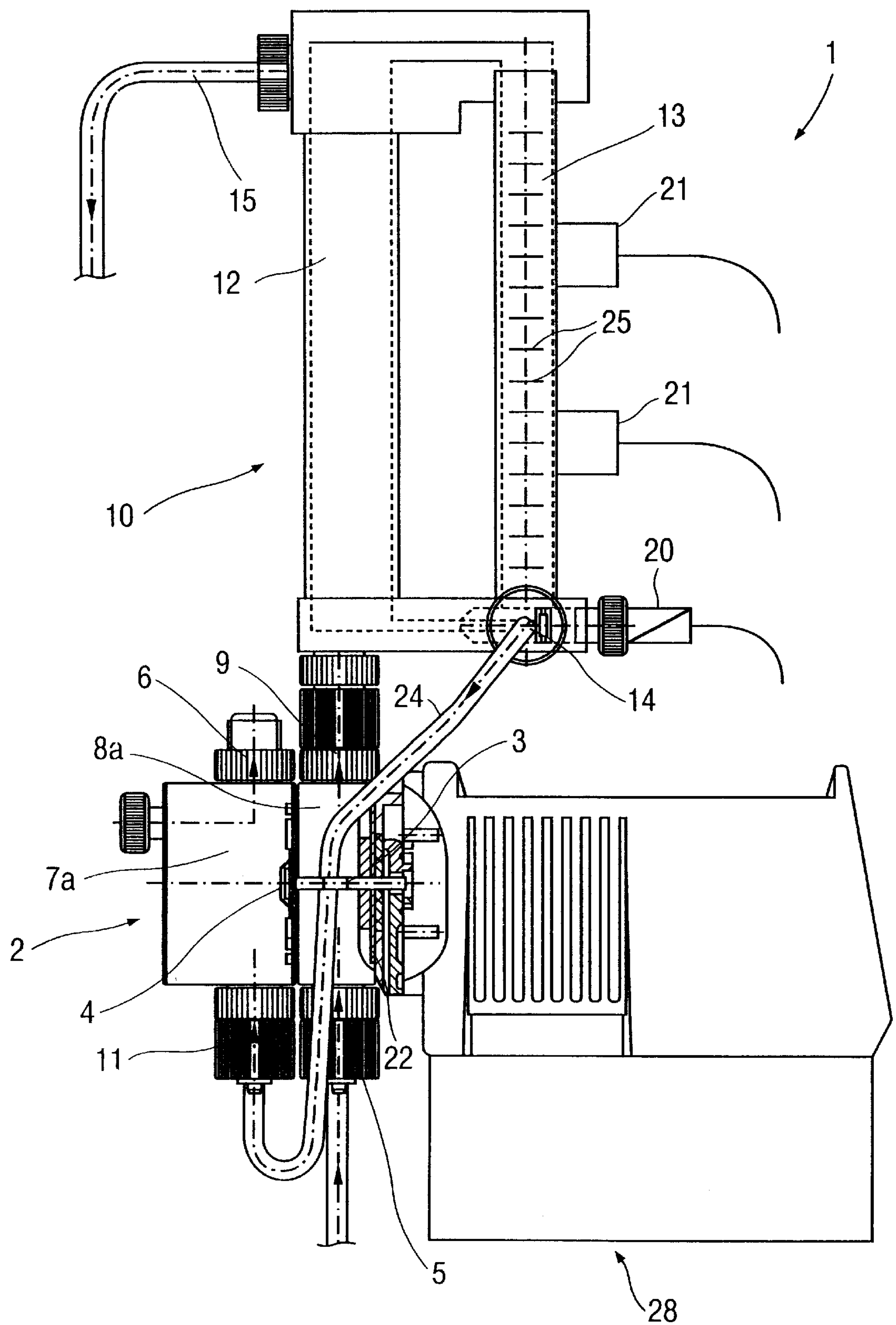
FIG. 1 A diagrammatic, part sectional view of a diaphragm dosing pump.

FIG. 1 shows a diaphragm dosing pump 1 with a casing 28 with a drive unit (not illustrated), on which is located a pump head 2 with a piston rod 3 driven by the drive unit and which carries two spaced, parallel diaphragms, namely a dosing diaphragm 4 and a delivery diaphragm 22 which also operates the same. The pump head 2 is connected by means of a suction connection 5 to a storage tank (not illustrated) containing the dosing fluid or liquid. The fluid or liquid is delivered in dose form via a pressure-side outlet 6 of the pump head 2.

Figure 2:
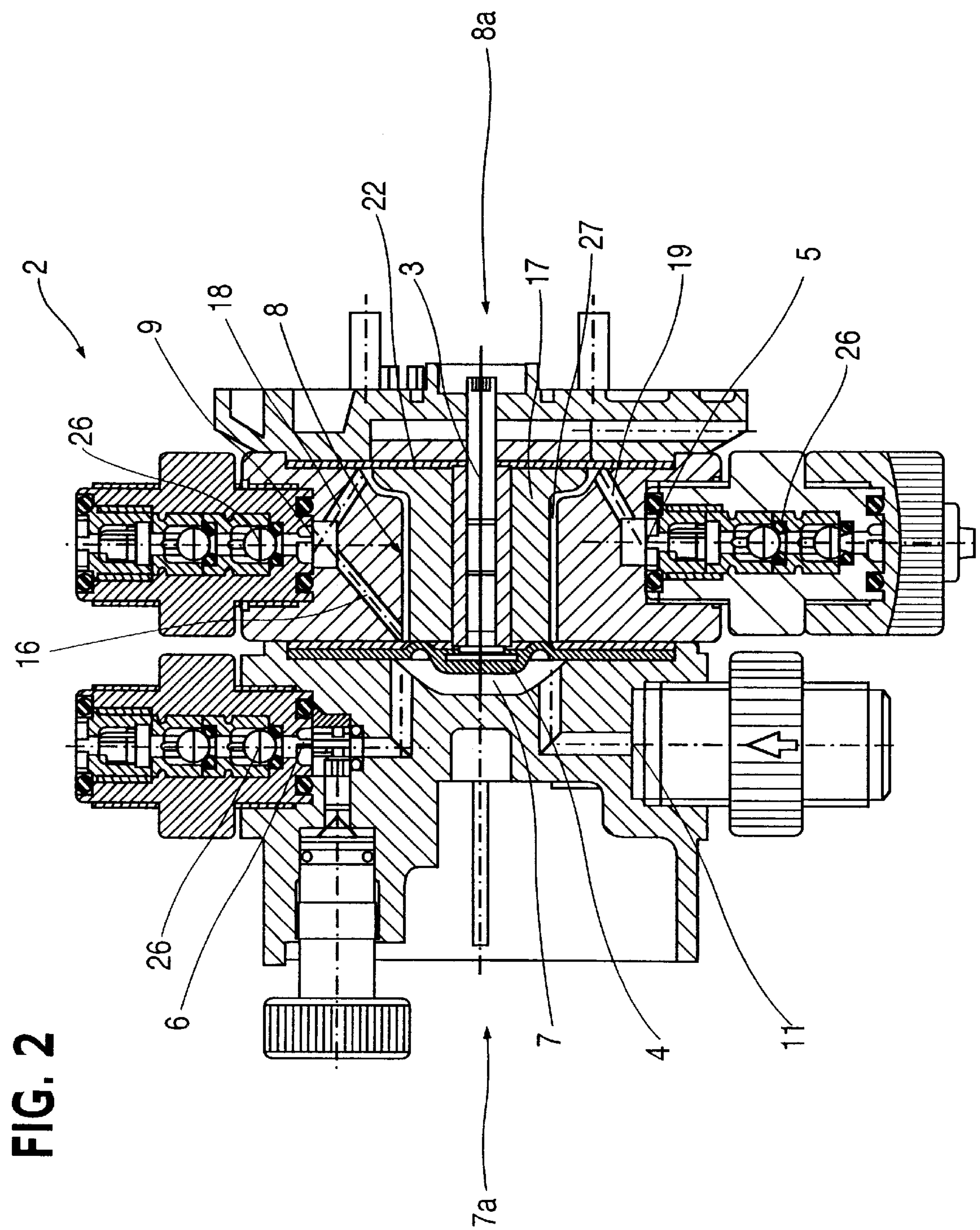
FIG. 2 A cross-sectional view of the pump head.

The pump head 2 has two separate areas 7*a* and 8*a,* in which is formed a dosing chamber 7 and a delivery chamber 8 (FIG. 2). The dosing diaphragm 4, acting in both chambers, extends between the dosing chamber 7 and the delivery chamber 8. Additionally the delivery diaphragm 22 acts in the delivery chamber 8 and produces a higher delivery volume than the dosing diaphragm 4. A pressure connection 9 of the delivery chamber 8 leads to a receiving container 10 (FIG. 1), which is in turn connected on the outlet side to an inlet 11 of the dosing chamber 7. The receiving container 10 is positioned above the dosing chamber 7, so that the liquid delivered from the storage tank via the delivery chamber 8 into the receiving container 10 can flow into the rising chamber 7 solely as a result of gravity and can then be delivered in dose by means of the pressure-side outlet 6.

The receiving container 10 comprises two partial areas 12 and 13 interconnected hydraulically at their upper and lower ends according to the principle of communicating tubes and which have at their common outlet a shutoff value 14 controllable in automated manner by means of a solenoid-operated valve 20. The partial area 13 is constructed as a measuring tube and with it are associated several sensors 21. Both the sensors 21 and the solenoid-operated switch 20 are connected to a processor unit (not illustrated). By shutting off the outlet of the partial areas 12 by means of the shutoff valve 14 it is possible by means of a scale 25 on the measuring tube 30 and/or by the level sensors 21 to establish the actual fill level and consequently determine the outflow over a period time.

In addition, the receiving container 10 has an overflow 15 by means of which it is possible to remove excess liquid and also gas volumes, which have arisen by degassing processes dur to the vacuum on delivering the liquid from the storage tank.

FIG. 2 shows the cross-section through the pump head 2 and on the left-hand side is shown the fixed dosing diaphragm 4 of the dosing chamber 7, to which can be supplied by means of the inlet 11 from the storage tank 10 the fluid or liquid to be dosed. At the opposite end of the dosing chamber 7 is provided the pressure-side outlet 6 by means of which the fluid or liquid is discharged from the dosing chamber 7.

On the side of the dosing diaphragm 4 remote from the dosing chamber 7 is located the delivery chamber 8 in the form of an annular clearance 27, which is formed between an inner wall of the casing and an insert 17 surrounding the piston rod 3. On the side remote from the dosing diaphragm 4 the delivery chamber 8 is bounded by the delivery diaphragm 22, which is also fixed to and operated by the piston rod 3. To the delivery chamber 8 is supplied by means of the suction connection 5 and the connecting passage 19 the liquid to be delivered from the not shown storage tank, whilst the pressure connection 9 of the delivery chamber 8 is formed by a first passage 18 issuing in the delivery chamber 8 close to the delivery diaphragm 22 and a second channel 16 issuing into the delivery chamber 8 close to the dosing diaphragm 4. The first and second channels are brought together in the pressure connection 9.

In all the suction and pressure-side connections both of the dosing chamber 7 and the delivery chamber 8 are provided check valves 26 of known construction opening in the delivery direction.

If the piston rod 3 according to FIG. 2 is moved to the right, also the dosing diaphragm 4 and delivery diaphragm 22 are moved to the right. The volume displaced during the movement of the delivery diaphragm 22 is larger than the volume displaced during the corresponding movement of the dosing diaphragm 4, because the internal diameter of the annular clearance 27 forming the delivery chamber 8 is increased on the side of the delivery diaphragm 22. The volume difference leads to an increase in the volume of the delivery chamber 8, so that by means of the suction connection 5 liquid is sucked from the storage tank into the delivery chamber. In the oppositely directed, to the left in FIG. 2, movement of the piston rod 3 with the diaphragms 4 and 22 the volume of the delivery chamber 8 is reduced, so that the liquid is delivered from the delivery chamber, via the pressure connection 9 into the receiving container 10.

During the movement to the right of the piston rod 3, i.e. during the suction stroke, liquid is sucked from the receiving container 10, via the inlet 11 into the dosing chamber 7 and during the opposite movement of the piston rod 3 is discharged in diced form from the dosing chamber 7 via the pressure-side outlet 6.

Figure 3:
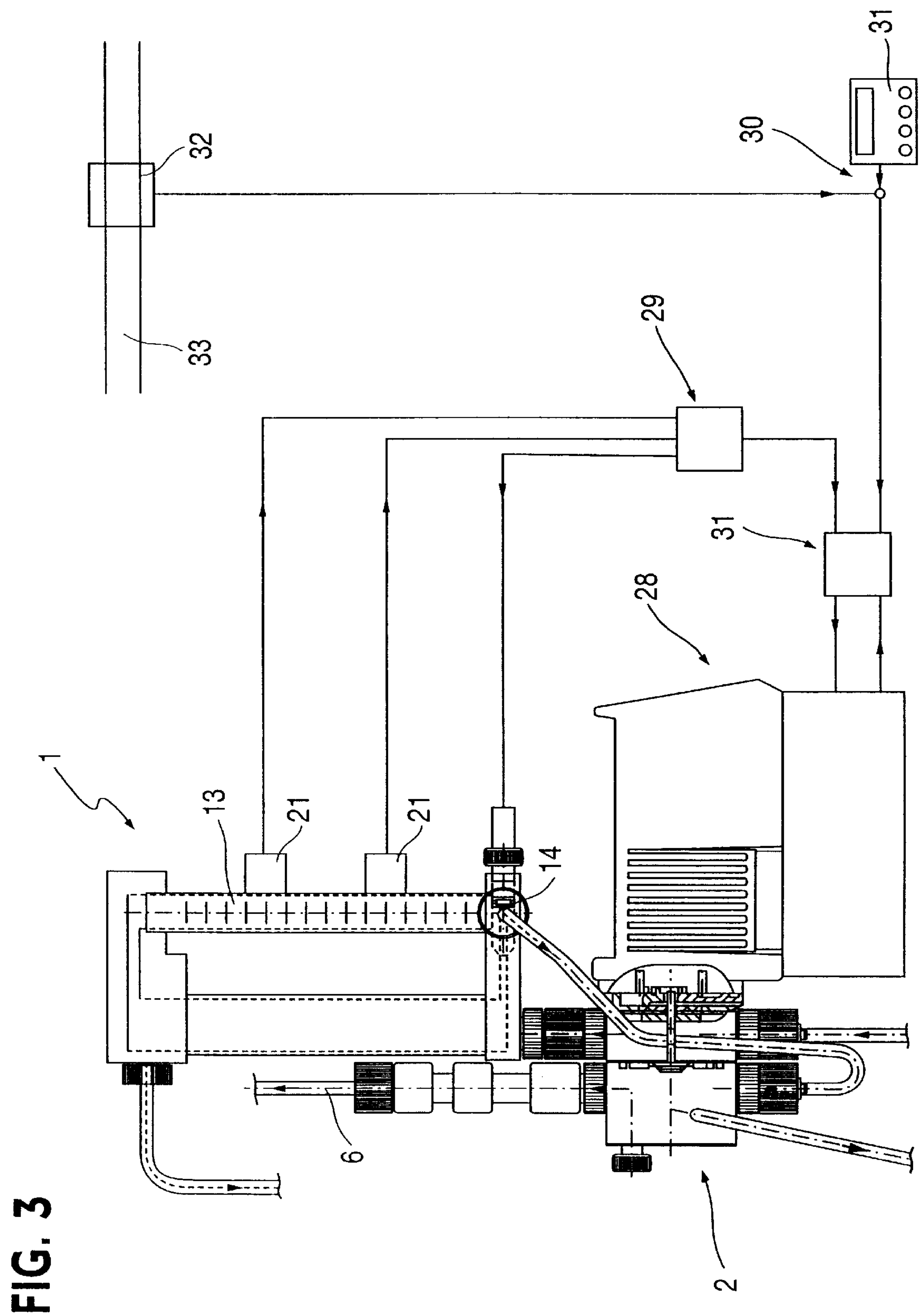
FIG. 3 A diagrammatic, part sectional view of the diaphragm dosing pump and control device.

FIG. 3 shows the diaphragm dosing pump 1 and the control device cooperating therewith and which comprises a unit for processing the actual value 29 cooperating with sensors 21 located on the measuring tube 13, a unit for giving a nominal value 30 and a regulator 31 for aligning the actual and nominal values. The regulator 31 controls the stroke drive in the casing 28. In one of the elements of the control or alternatively in a CPU there is a conversion of the dosing volume determined via the fill measurement using the sensors 21 and in the regulator 31 it is related to the drive values characterizing the dosing volume and which pass to the regulator as an answer-back signal from the drive.

The unit for giving the nominal value can either be in the form of a programming device by means of which e.g. manually a specific value can be inputted, or as a sensor, which e.g. records the volume flow in a pipeline 33 and on the basis of this value gives a nominal value for the volume flow to be dosed by means of the pump 1 into the pipeline. Dosing takes place by means of a not shown connection between the pressure-side connection 6 of the pump head 2 and the pipeline 33. An automated control of the shutoff value 14 takes place by means of the unit 20 of the control device.

When using a stepping motor as the stroke drive a very precise control of the drive by means of the controller or regulator 31 is possible and this also permits through the digitized pulse-pause operation and the answer-back signal of the drive motor to the regulator 31 a batchwise dosing with the smallest possible units.

What is claimed is:

1. A diaphragm dosing pump having a dosing chamber, which has an inlet and a pressure-side outlet, a dosing diaphragm operated by a stroke drive, a delivery chamber positioned upstream of the dosing chamber and which has a suction connection for a medium to be dosed, a pressure connection, and delivery diaphragm operation by a stroke drive, where the delivery chamber is connected by means of the pressure connection to a receiving container and the receiving container is connected on an outlet side with an inlet of the dosing chamber.

2. A diaphragm dosing pump according to claim 1, wherein:

the receiving container is located above the dosing chamber.

3. A diaphragm dosing pump according to claim 1, wherein:

the receiving container is formed by two communicating partial areas, which are hydraulically connected at two ends and connected by means of a common discharge line to the inlet of the dosing chamber and whereof one end is designed as a flow measuring tube and a common discharge line has a shutoff valve, which in a closed position only frees a path from a measuring tube to the inlet of the dosing chamber.

4. A diaphragm dosing pump according to claim 2, wherein:

the receiving container is formed by two communicating partial areas, which are hydraulically connected at two ends and connected by means of a common discharge line to the inlet of the dosing chamber and whereof one end is designed as a flow measuring tube and a common discharge line has a shutoff valve, which in a closed position only frees a path from a measuring tube to the inlet of the dosing chamber.

5. A diaphragm dosing pump according to claim 3, wherein:

the measuring tube has a measurement scale.

6. A diaphragm dosing pump according to claim 4, wherein:

the measuring tube has a measurement scale.

7. A diaphragm dosing pump according to claim 3, wherein:

the shutoff valve is controllable in an automated manner to provide a measuring process.

8. A diaphragm dosing pump according to claim 4, wherein:

the shutoff valve is controllable in an automated manner to provide a measuring process.

9. A diaphragm dosing pump according to claim 1, wherein:

the receiving container has an overflow open to an atmosphere.

10. A diaphragm dosing pump according to claim 1, wherein the dosing diaphragm and the delivery diaphragm are connected to a common piston rod which reciprocally drives the diaphragms.

11. A diaphragm dosing pump according to claim 1, wherein:

the dosing diaphragm, on a back part remote from the dosing chamber, acts, in addition to a delivery diaphragm, as a pump member in a delivery chamber.

12. A diaphragm dosing pump according to claim 10, wherein:

the dosing diaphragm, on a back part remote from the dosing chamber, acts, in addition to a delivery diaphragm, as a pump member in a delivery chamber.

13. A diaphragm dosing pump according to claim 1, wherein:

the delivery chamber is formed by an annular clearance arranged concentrically to the piston rod in a casing thereof and is bounded on one side by a back part of the dosing diaphragm and on an opposite side by the delivery diaphragm.

14. A diaphragm dosing pump according to claim 11, wherein:

the delivery chamber is formed by an annular clearance arranged concentrically to the piston rod in a casing thereof and is bounded on one side by a back part of the dosing diaphragm and on an opposite side by the delivery diaphragm.

15. A diaphragm dosing pump according to claim 13, wherein:

an annular clearance has a smaller diameter on a dosing diaphragm side than on a delivery diaphragm side.

16. A diaphragm dosing pump according to claim 1, wherein:

the suction connection and pressure connection of the delivery chamber issue on a side of an annular clearance facing the delivery diaphragm.

17. A diaphragm dosing pump according to claim 13, wherein:

the suction connection and pressure connection of the delivery chamber issue on a side of an annular clearance facing the delivery diaphragm.

18. A diaphragm dosing pump according to claim 1, wherein:

the delivery chamber contains an additional, pressure-side connection to an area of an annular clearance adjacent to the dosing diaphragm.

19. A diaphragm dosing pump according to claim 13, wherein:

the delivery chamber contains an additional, pressure-side connection to an area of an annular clearance adjacent to the dosing diaphragm.

20. A diaphragm dosing pump according to claim 18, wherein:

an additional, pressure-side connection of the delivery chamber issues into the pressure connection to the receiving container including a check valve.

21. A diaphragm dosing pump according to claim 1, wherein:

a delivery volume displaced per diaphragm stroke in the delivery chamber is greater than a dosing volume simultaneously displaced in the dosing chamber.

22. A diaphragm dosing pump according to claim 1, further comprising:

a measuring tube having at least one sensor for determining a fill level of the receiving container.

23. A diaphragm dosing pump according to claim 3, further comprising:

a measuring tube having at least one sensor for determining a fill level of the receiving container.

24. A diaphragm dosing pump according to claim 1, further comprising:

a control device of the pump, including a sensor, for the automated control of a stroke drive of the pump.

25. A diaphragm dosing pump according to claim 22, further comprising:

a control device of the pump, including a sensor, for the automated control of a stroke drive of the pump.

26. A diaphragm dosing pump according to claim 24, wherein:

the control device has a unit for giving a nominal value fixing a delivery volume per time unit, a unit for determining an actual delivery rate per time unit value and a regulator for aligning the nominal and actual values.

27. A diaphragm dosing pump according to claim 17, wherein:

the unit for determining the actual value is connected to the at least one sensor.

28. A diaphragm dosing pump according to claim 22, wherein:

the at least one sensor is a pressure sensor.

29. A diaphragm dosing pump according to claim 22, wherein:

the measuring tube has two sensors arranged at different levels thereof.

30. A diaphragm dosing pump according to claim 27, wherein:

the measuring tube has two sensors arranged at different levels thereof.

31. A diaphragm dosing pump according to claim 1, wherein:

the stroke drive is a stepping motor.

32. A diaphragm dosing pump according to claim 1, wherein:

the stroke drive operates the delivery diaphragm with one of a constant stroke path or with a constant stroke frequency.

33. A diaphragm dosing pump according to claim 31, wherein:

the stroke drive operates the delivery diaphragm with one of a constant stroke path or with a constant stroke frequency.

* * * * *